United States Patent

Counsell et al.

[11] Patent Number: 5,859,584
[45] Date of Patent: Jan. 12, 1999

[54] COMBINED DATA AND POWER TRANSMISSION

[75] Inventors: Michael Counsell, Congleton; Wayne Gilbert, Staffs, both of England

[73] Assignee: International Computers Limited, London, United Kingdom

[21] Appl. No.: 749,226

[22] Filed: Nov. 14, 1996

[30] Foreign Application Priority Data

Dec. 6, 1995 [GB] United Kingdom ............... 9524948

[51] Int. Cl.$^6$ ................................................ G08B 1/08
[52] U.S. Cl. ............. 340/538; 340/310.01; 340/310.03; 340/310.06; 340/310.07
[58] Field of Search ................... 340/428, 310.01–310.07

[56] References Cited

U.S. PATENT DOCUMENTS

| 4,029,904 | 6/1977 | Papeschi ................................. 178/88 |
| 4,633,218 | 12/1986 | Palsgrove ............................ 340/310 A |
| 5,391,932 | 2/1995 | Small ..................................... 307/125 |
| 5,644,286 | 7/1997 | Brosh et al. ........................ 340/310.01 |

FOREIGN PATENT DOCUMENTS 0 355 532  2/1990  European Pat. Off. .
61-208928  9/1986  Japan .

*Primary Examiner*—Thomas J. Mullen, Jr.
*Assistant Examiner*—Daryl C. Pope
*Attorney, Agent, or Firm*—Lee, Mann, Smith, McWilliams, Sweeney & Ohlson

[57] ABSTRACT

A combined data and power transmission arrangement has one or more power supplies and loads interconnected by a power transmission line, with transmitters and receivers for transmitting a digital data signal over the transmission line. The transmitter and receiver each include an inductor for providing a high impedance barrier to a data signal on the line, so as to isolate the data signal from the power supply and load. The receiver includes circuits for tracking the mid-point value of the data signal to produce a threshold value, and for comparing the threshold value with the data signal to produce an output signal. The threshold value is a controlled positive feedback signal derived from the output of the comparator by way of a positive feedback loop having a time constant approximately equal to the time constant of the transmitter.

4 Claims, 2 Drawing Sheets

COMBINED DATA AND POWER TRANSMISSION

BACKGROUND OF THE INVENTION

This invention relates to combined data and power transmission arrangements.

A combined data and power transmission arrangement may be used, for example, to distribute electrical power to various components in a vehicle, and also to transmit digital data signals between those components.

A problem with combining data and power transmission on the same physical cable is that fluctuations in the power supply level, caused for example by variations in the power drawn by the load, can affect the data signal levels, and hence can result in corruption of the data. The data signal can be isolated from power voltage variations by capacitively coupling it to the line. However, a side effect of this is that the average level of the data will then depend on the data pattern, thus making the data pattern-sensitive. The object of the present invention is to provide a way of reducing or overcoming these problems.

SUMMARY OF THE INVENTION

According to the invention there is provided a combined data and power transmission arrangement comprising one or more power supplies and one or more loads interconnected by a power transmission line, and transmitters and receivers for transmitting a digital data signal over the transmission line, wherein the transmitter and receiver each include an inductor for providing a high impedance barrier to a data signal on the line, so as to isolate the data signal from the power supply and load, and wherein the receiver includes means for tracking the mid-point value of the data signal to produce a threshold value, and for comparing the threshold value with the data signal to produce an output signal.

DESCRIPTION OF AN EMBODIMENT OF THE INVENTION

One combined data and power transmission arrangement in accordance with the invention will now be described by way of example with reference to the accompanying drawings.

Figure 1:
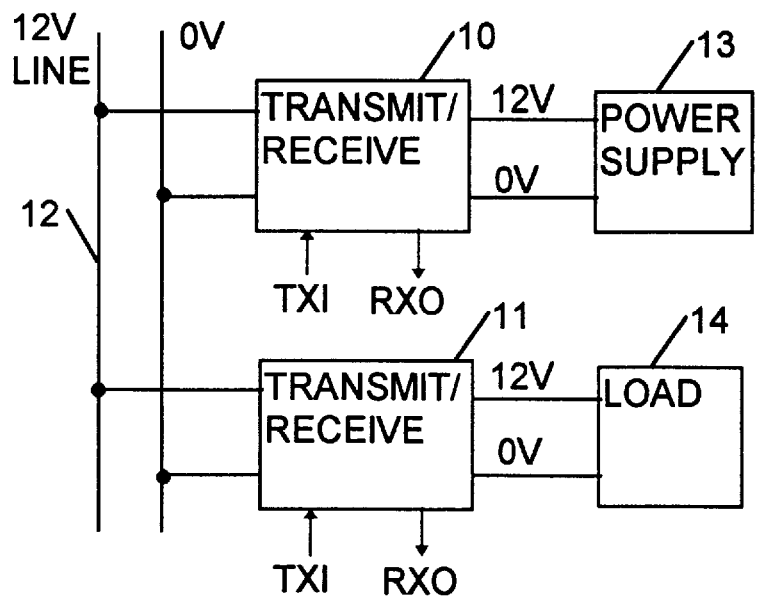
FIG. 1 is a block diagram of a combined data and power transmission arrangement in accordance with the invention, including two transmitter/receiver units.

Referring to FIG. 1, the combined data and power transmission arrangement comprises two transmitter/receiver units 10, 11 interconnected by a line 12. One transmitter/receiver unit 10 is connected to a 12-volt DC power supply 13, while the other transmitter/receiver unit 11 is connected to an electrical load 14.

Each of the transmitter/receiver units has a data input TXI for inputting data to be transmitted, and a data output RXO for outputting received data. The line 12 carries electrical power from the supply 13 to the load 14, and also carries data signals in both directions between the two transmitter/receiver units. The line may be a conventional 2-core power cable. The data transmission rate is approximately 200 Kbits per second.

Figure 2:
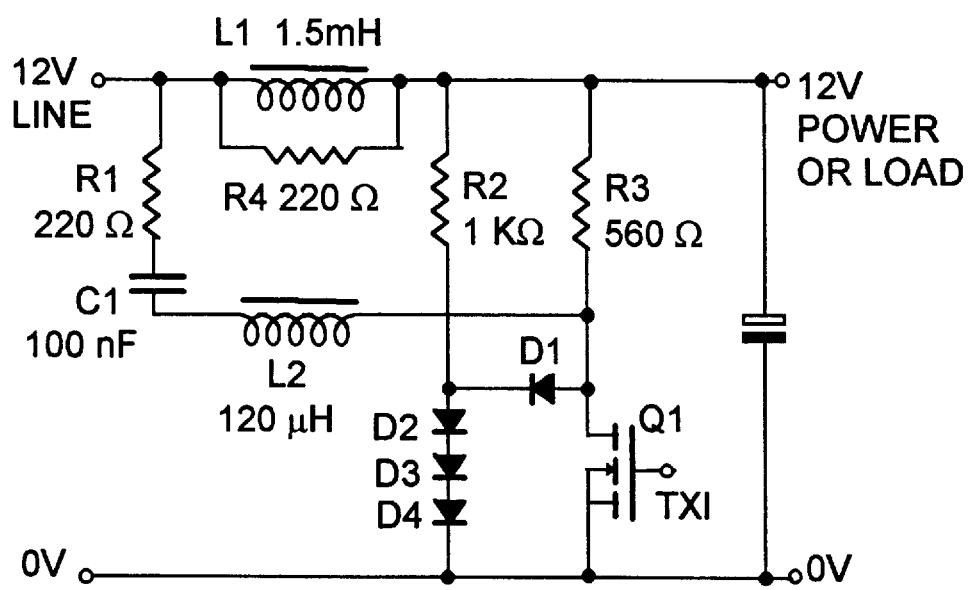
FIG. 2 is a circuit diagram showing a transmitter circuit forming part of one of the transmitter/receiver units.

FIG. 2 shows the transmitter part of one of the transmitter/receiver units 10, 11.

Each of the units 10, 11 includes a 1.5 mH inductor L1, connected in series between the line 12 and the connected power supply 13 or load 14. The inductor presents a low resistance to DC current, and hence does not interfere with power transmission. On the other hand, the inductor presents relatively high impedance to the data signals, and hence acts as a barrier to those signals, preventing them from reaching the supply or load. In this example, the inductor L1 is constructed with 120 turns wound on an EP25 core with limbs.

The input data signal TXI is applied to the gate of a FET (field effect transistor) Q1, which in this example is a VN1206 FET. The drain electrode of Q1 is connected to the line 12 by way of a 120 $\mu$H inductor L2, a 100 nF capacitor C1, and a 220 Ohm resistor R1. The inductor L2 causes the transmitted data signal to have a relatively slow rise time of 0.5 microseconds, thus minimising RF radiation from the line. L2 is a small component, rated to carry only 10 milliamps without saturation. The resonance of L2/C1, calculated at 50 KHz, was found to be no problem due to the heavy circuit damping of the series resistor R1.

A chain of four diodes D1–D4 is connected between the source and drain electrodes of Q1. These diodes limit the voltage excursion of the drain electrode of Q1 to a maximum of 3 V.

A fifth of this signal is launched down the line and this small signal (600 mV at 10 mA) also minimises RF radiation.

A 220 Ohm resistor R4 is connected in parallel with L1. This, together with R1, gives a line matching impedance of 110 Ohms. The time constant of L1 with the resistors R1, R4 is 20 microseconds.

Figure 3:
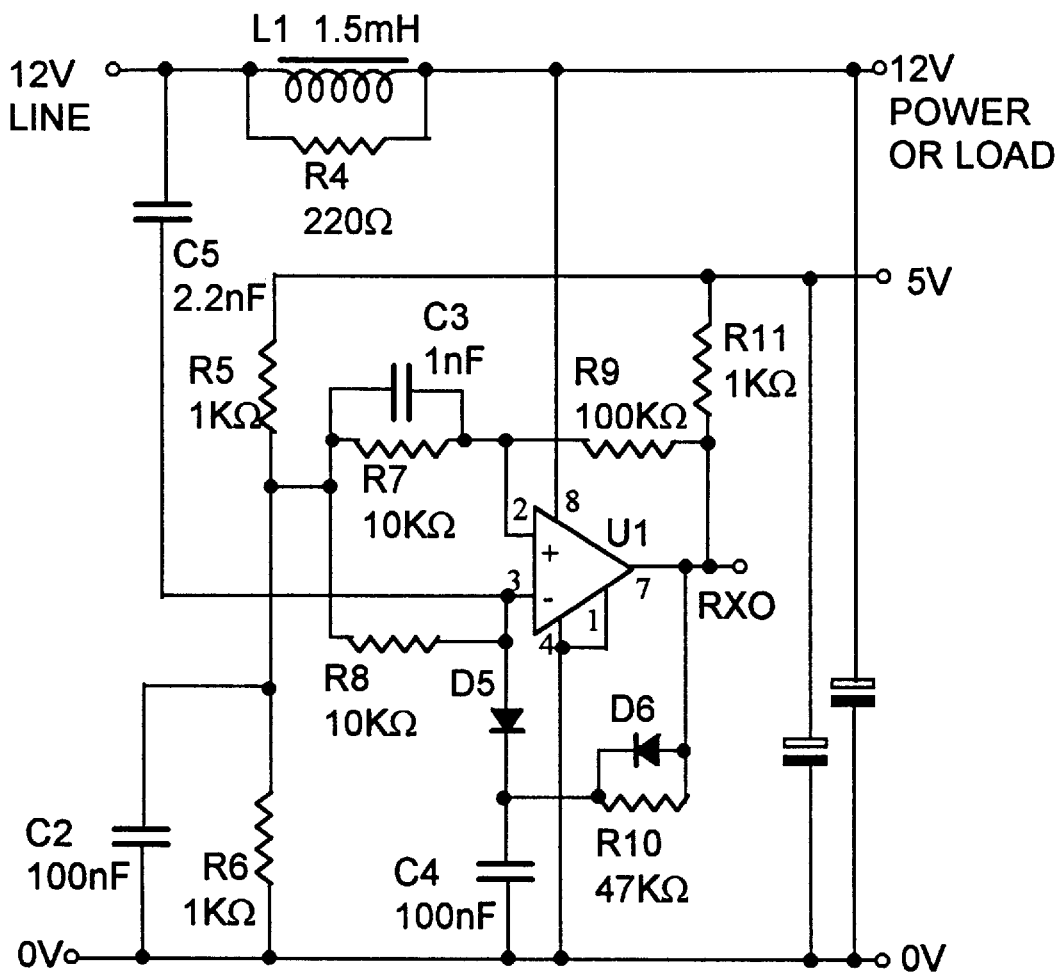
FIG. 3 is a circuit diagram showing a receiver circuit forming part of one of the transmitter/receiver units.

FIG. 3 shows the receiver part of one of the transmitter/receiver units 10, 11. It should be noted that, in FIG. 3, the inductor L1 and the resistor R4 are shown again: these are the same components as shown in FIG. 2.

The data signal from the line 12 is coupled by way of a 2.2 nanofarad capacitor C5 to the inverting input (pin 3) of a high speed comparator circuit U1. The time constant of C5/R8 is 22 microseconds. The comparator circuit U1 compares the data signal with a threshold signal, applied to its positive input (pin 2). U1 produces a low output when the data signal is greater than the threshold, and a high output when the data signal is lower than the threshold. The output of U1 (pin 7) is fed to the data output terminal RXO.

The threshold signal is a positive feedback signal, derived from the output of U1 by way of a potential divider chain, comprising a 100 KOhm resistor R9 and a 10 KOhm resistor R7. Resistor R7 has a 1 nanofarad capacitor C3 connected in parallel with it, to give a time constant of 9 microseconds. This time constant approximates the overall time constant of the transmitter components plus that of C5/R8, and ensures that the threshold signal tracks the mean level of the incoming data signal, and is independent of the data pattern.

As a result, it can be seen that the receiver circuit is adaptive, in that the threshold level of the comparator tracks the average level of the incoming data, so as to ensure that fluctuations in the average signal level do not interfere with the correct reception of the data. A high frequency noise immunity of around 200 mV is maintained both during and in the absence of data transmission. At lower frequencies, higher noise immunity is obtained because of the low value of the AC coupling capacitor C5.

The system has been shown to stand up to transient loads sufficient to produce up to 6 V excursions from the 12 V load, before data corruption is encountered. With such a transient load, the excursion down the power line was measured at 4 V peak, with a maximum edge speed of 10 V/millisecond. Calculation shows that this will produce an offset voltage of 220 mV at pin 3 of U1 during the edge. This equates to the noise immunity of the receiver.

Components R10, C4, D5 and D6 ensure that the output of the comparator is returned to a high level in the event that it has been low for a period in excess of 5 milliseconds; this being a requirement of the particular application.

Some Possible Modifications

It will be appreciated that many modifications may be made to the system described above without departing from the scope of the present invention. For example, the component values given are by way of example only, and may be varied.

In one possible modification, instead of using an analog comparator circuit such as U1, the comparison between the incoming data signal and the threshold could be performed digitally, using a digital signal processor.

While in the above description the power supply was a DC supply, the invention could also be adapted to handle data transmission over the same line as an AC power supply.

We claim:

1. A combined data and power transmission arrangement comprising one or more power supplies and loads interconnected by a power transmission line, and transmitters and receivers for transmitting a digital data signal over the transmission line, wherein the transmitter and receiver each include an inductor for providing a high impedance barrier to a data signal on the line, so as to isolate the data signal from the power supply and load, and wherein the receiver includes means for averaging the data signal to produce a threshold value, and a comparator having a first input which receives the data signal from the line, a second input which receives said threshold value, and an output which provides an output signal, said threshold value comprising a controlled positive feedback signal derived from said output of the comparator.

2. An arrangement according to claim 1 wherein the threshold value is derived from the output of the comparator by way of a positive feedback loop having a time constant approximately equal to the time constant of the transmitter.

3. A transmitter/receiver circuit for use with a combined data and power transmission arrangement for transmitting digital data signals and power over a line, the circuit comprising:

an inductor for providing a high impedance barrier to a data signal on the line, so as to isolate the data signals from a power supply and load, means for averaging a data signal to produce a threshold value, and a comparator having a first input which receives the data signal from the line, a second input which receives the threshold value, and an output which provides an output signal, said threshold value comprising a controlled positive feedback signal derived from the output of the comparator.

4. A circuit according to claim 3 wherein the threshold value is derived from the output of the comparator by way of a positive feedback loop having a time constant approximately equal to the time constant of the transmitter.

* * * * *